US011853454B1

(12) United States Patent
Tarsi et al.

(10) Patent No.: US 11,853,454 B1
(45) Date of Patent: Dec. 26, 2023

(54) SYSTEMS AND METHODS FOR PREPARING A SECURE SEARCH INDEX FOR SECURELY DETECTING PERSONALLY IDENTIFIABLE INFORMATION

(71) Applicant: CA, INC., San Jose, CA (US)

(72) Inventors: Yuval Tarsi, Boulder, CO (US); Stefano Emiliozzi, Danville, CA (US)

(73) Assignee: CA, Inc., San Jose, CA (US)

(*) Notice: Subject to any disclaimer, the term of this patent is extended or adjusted under 35 U.S.C. 154(b) by 1244 days.

(21) Appl. No.: 16/427,884

(22) Filed: May 31, 2019

(51) Int. Cl.
G06F 21/62 (2013.01)
H04L 9/32 (2006.01)
H04L 9/08 (2006.01)
H04L 9/06 (2006.01)
G06F 21/60 (2013.01)

(52) U.S. Cl.
CPC ........ G06F 21/6245 (2013.01); G06F 21/602 (2013.01); H04L 9/0643 (2013.01); H04L 9/0869 (2013.01); H04L 9/3213 (2013.01); H04L 9/3242 (2013.01)

(58) Field of Classification Search
CPC ............. G06F 21/6227; G06F 21/6245; G06F 21/602; G06F 21/6218; G06F 21/6254; G06F 21/64; G06F 16/9535; H04L 9/50; H04L 9/3239; H04L 9/3242; H04L 9/3236; H04L 9/0643; H04L 9/0869; H04L 9/3213; H04L 9/0866; H04L 63/10; G16H 10/60
See application file for complete search history.

(56) References Cited

U.S. PATENT DOCUMENTS

| 9,971,809 B1* | 5/2018 | Tarsi | G06F 16/2455 |
| 2010/0070549 A1* | 3/2010 | Nagaraj | G06F 7/588 708/254 |
| 2012/0060035 A1* | 3/2012 | Kalmady | H04L 9/0894 713/176 |
| 2012/0072982 A1* | 3/2012 | Ranganathan | G06Q 30/06 726/22 |
| 2015/0350186 A1* | 12/2015 | Chan | H04L 63/0815 726/9 |
| 2016/0248583 A1* | 8/2016 | McClanahan | G06F 21/78 |
| 2018/0075262 A1* | 3/2018 | Auh | H04L 9/085 |

(Continued)

OTHER PUBLICATIONS

Jurafsky et al., "Regular Expressions, Text Normalization, Edit Distance", Speech and Language Processing, Chapter 2, Sep. 23, 2018, pp. 1-28.

(Continued)

*Primary Examiner* — Jeremy S Duffield
(74) *Attorney, Agent, or Firm* — Foley & Lardner LLP

(57) ABSTRACT

The disclosed computer-implemented method for preparing a secure search index for securely detecting personally identifiable information may include (i) receiving, at a computing device, a dataset including a record, where the record has a field including a value describing personally identifiable information and (ii) performing, at the computing device, a security action. The security action may include (i) generating, using a perfect hash function, a respective hashed key from the value and (ii) adding, to the secure search index (a) the respective hashed key or (b) a subsequent hashed key created from the respective hashed key. Various other methods, systems, and computer-readable media are also disclosed.

17 Claims, 17 Drawing Sheets

(56) References Cited

U.S. PATENT DOCUMENTS

| | | | |
|---|---|---|---|
| 2018/0336263 A1* | 11/2018 | Bensberg | G06F 16/284 |
| 2019/0007387 A1* | 1/2019 | Jin | G06F 16/951 |
| 2020/0117546 A1* | 4/2020 | Wong | G06F 16/137 |
| 2020/0272612 A1* | 8/2020 | Velur | G06F 21/6227 |

OTHER PUBLICATIONS

Fredman et al., "Storing a Sparse Table with O(1) Worst Case Access Time", URL: https://cs.dartmouth.edu/~ac/Teach/CS105-Winter05/Handouts/fks-perfecthash.pdf, Journal of the Association for Computing Machinery, vol. 31, No. 3, Jul. 1984, pp. 538-544.

Wikipedia, "Dynamic perfect hashing", URL: https://en.wikipedia.org/wiki/Dynamic_perfect_hashing, retrieved on Jun. 27, 2019, pp. 1-6.

Wikipedia, "Perfect hash function", URL: https://en.wikipedia.org/wiki/Perfect_hash_function, retrieved on Jun. 27, 2019, pp. 1-5.

* cited by examiner

| SSN | PII(SSN) | First Name | Last Name |
|---|---|---|---|
| 123-45-6789 | 7 | John | Smith |
| 111-11-1111 | 3 | Jane | Adams |
| 333-33-3333 | 8 | Jane | Baker |

Value 38 added with key 8 using hash function 0

Values to add to collision free set: 15, 65, 78

Pending values: -

Blocked keys: -

$h_0(38) = H(38) \bmod 17 = 8$

*FIG. 6*

Value 15 added with Key 11 using hash function 0

Values to add to collision free set: 65, 78
Pending values: -
Blocked keys: -

$h_0(15) = H(15) \bmod 17 = 11$

Value 78 added with key 13 using hash function 1

Values to add to collision free set: -

Pending values: 65

Blocked keys: 7

$h_1(78) = 7 + s_1 + p_1 \cdot bit_1(H(78)) \bmod 17$
$s_1 = 4, p_1 = 2, bit_1(H(78)) = 1$

*FIG. 10*

Value 65 collided with value 78 at key 13 using hash function 1

Values to add to collision free set: -

Pending values: 65, 78

Blocked keys: 7, 13

$h_1(65) = 7 + s_1 + p_1 \cdot bit_1(H(65)) \bmod 17$
$s_1 = 4, p_1 = 2, bit_1(H(65)) = 1$
$H(65) \equiv H(78) \bmod 17, bit_1(H(65)) = bit_1(H(78)) \Rightarrow collision$

*FIG. 11*

Value 65 added with key 12 using hash function 2

Values to add to collision free set: --

Pending values: 78

Blocked keys: 7, 13

$h_2(65) = 7 + s_2 + p_2 \cdot bit_2(H(65)) \mod 17$
$s_2 = 5, p_2 = 6, bit_2(H(65)) = 0$

FIG. 12

Value 78 added with key 1 using hash function 2, collision resolved

Values to add to collision free set: -

Pending values: -

Blocked keys: 7, 13

$h_2(78) = 7 + s_2 + p_2 \cdot bit_2(H(78)) \bmod 17$
$s_2 = 5, p_2 = 6, bit_2(H(78)) = 1$
$bit_2(H(65)) \neq bit_2(H(78)) \Rightarrow no\ collision$

*FIG. 13*

$(S|PHF_1(S) = 3) \cap (S|PHF_2(S) = 2) = \{111-11-1111\}$ 111-11-1111 is vulnerable to an intersection attack

| $PHF_1(SSN) = 3$ | $PHF_2(SSN) = 2$ |
|---|---|
| 111-11-1111 | 111-11-1111 |
| 268-21-3287 | 268-21-3287 |
| 169-38-1419 | 259-30-7589 |
| 185-95-2346 | 185-95-2346 |
| 138-69-1135 | 735-68-1914 |

$(S|PHF_1(S) = 3) \cap (S|PHF_2(S) = 2) = \{111-11-1111, 268-21-3287, 185-95-2346\}$ 111-11-1111 is not vulnerable to an intersection attack

*FIG. 15*

SYSTEMS AND METHODS FOR PREPARING A SECURE SEARCH INDEX FOR SECURELY DETECTING PERSONALLY IDENTIFIABLE INFORMATION

BACKGROUND

Detecting personally identifiable information (PII) such as identification (ID) numbers, social security numbers, account numbers in conjunction with names, emails, addresses, phone numbers and the like may be a common problem in many security-related applications including data loss prevention (DLP), fraud prevention, regulatory compliance, and data discovery applications. Detecting PII may be accomplished by comparing query text to a PII database of known PII and determining whether the query text contains identifiers associated with particular records in the PII database (e.g. determining whether the query text contains a name and associated ID number in the database).

In some cases, detection of PII may be performed by an entity that is not trusted to have knowledge of the PII database. For example, when performing PII detection on a corporate employee endpoint, storing the PII database on the endpoint in itself poses an unacceptable data loss and/or compliance risk. This risk may be mitigated using encryption and cryptographic hashing techniques. While helpful, such techniques may be limited in their efficacy. For example, encryption requires the entity performing PII detection have access to the required decryption keys, making the entity performing PII detection a potential source of data leakage. In some examples, hashing may be limited by entropy of underlying identifiers. Since the identifier space may often be quite small (e.g., on an order of $10^9$ for social security numbers), an attacker may quickly and easily construct the hash values for all possible identifiers, and thus reverse any hashes of sensitive identifiers and recover sensitive information from the hashed database. Since the identifier space is so small, reconstruction risk applies even when the hash is salted and/or when using a Hash Message Authentication Code (HMAC) algorithm. The present disclosure, therefore, identifies and addresses a need for systems and methods for preparing a secure search index for securely detecting personally identifiable information even when devices performing the detecting are not trusted to have knowledge of the PII database.

SUMMARY

As will be described in greater detail below, the present disclosure describes various systems and methods for preparing a secure search index for securely detecting personally identifiable information.

In one example, a method for preparing a secure search index for securely detecting personally identifiable information may include (i) receiving, at a computing device, a dataset including a first record, where the first record has a first field including a first value describing personally identifiable information and (ii) performing, at the computing device, a security action. The security action may include (i) generating, using a perfect hash function, a respective hashed key from the first value and (ii) adding, to the secure search index (a) the respective hashed key or (b) a subsequent hashed key created from the respective hashed key. In some examples, the first value may include a social security number.

In some embodiments, generating the respective hashed key may further include (i) generating, using a base hash function, a first hashed key from the first value, (ii) detecting a collision between the first hashed key and a second hashed key already in a set of valid hash values (i.e., due to the first hashed key and the second hashed key being the same), (iii) blocking, responsive to the collision, the first hashed key and the second hashed key from use in the set of valid hash values, (iv) generating a third hashed key from the base hash function, a first shift value, a first split value, and a value of a first bit in a binary representation of the base hash function applied to the first value, (v) generating a fourth hashed key from the base hash function, the first shift value, the first split value, and a value of a first bit in a binary representation of the base hash function applied to the second value, and (vi) when the third hashed key and the fourth hashed key are different (a) adding the third hashed key and the fourth hashed key to the set of valid hash values and (b) using the third hashed key as the respective hashed key.

In some examples, the method may further include generating, using the base hash function, the second hashed key from a second value from a first field of a second record. In an example, the first shift value and the first split value may be random numbers. In some embodiments, the method may further include (i) randomly selecting a base value and (ii) generating the first shift value, the first split value, a subsequent shift value, and a subsequent split value by repeatedly applying a cryptographic hash function to the base value. In some embodiments, the method may further include storing the blocked first hashed key and the blocked second hashed key.

In some examples, the method may further include (i) detecting a collision between the third hashed key and the fourth hashed key (i.e., due to the third hashed key and the fourth hashed key being the same), (ii) blocking, responsive to the collision, the third hashed key and the fourth hashed key from use in the set of valid hash values, (iii) generating a fifth hashed key from the base hash function, a second shift value, a second split value, and a value of a second bit in a binary representation of the base hash function applied to the first value, (iv) generating a sixth hashed key from the base hash function, the second shift value, the second split value, and a value of a second bit in a binary representation of the base hash function applied to the second value, and (v) when the fifth hashed key and the sixth hashed key are different (a) adding the fifth hashed key and the sixth hashed key to the set of valid hash values and (b) using the fifth hashed key as the respective hashed key. In an embodiment, the second shift value and the second split value may be random numbers.

In an example, the method may further include (i) generating a concatenated value by concatenating the respective hashed key with a second value from a second field of the first record, (ii) applying a cryptographic hash function to the concatenated value to create the subsequent hashed key, and (iii) adding the subsequent hashed key to the secure search index. In some examples, the cryptographic hash function may be a Hash Message Authentication Code (HMAC) algorithm.

In some embodiments, the method may further include (i) receiving a request to search a document, (ii) extracting a first token and a second token from the document, (iii) generating a candidate hashed key from the first token and the second token, (iv) querying the secure search index to determine whether the candidate hashed key matches any hashed key in the secure search index and (v) responding, upon determining the candidate hashed key matches a hashed key in the secure search index, to the request with information about the document. In an example, (i) values in the first field may follow a known pattern, (ii) the request to search the document may specify the first token is required to be within a specified distance from the second token, and (iii) extracting the first token and the second token from the document may include (a) using the known pattern to identify the first token within the document and (b) identifying the second token within the specified distance from the first token.

In some embodiments, (i) values in the first field may follow a known pattern and (ii) extracting the first token from the document may include using a regular expression based on the known pattern to identify the first token within the document. In some examples, (i) the computing device may be a server-side computing device and (ii) extracting the first token and the second token, generating the candidate hashed key, and querying the secure search index may be performed at a client-side computing device to which the secure search index has been distributed. In an example, generating the candidate hashed key may further include (i) generating, using the perfect hash function, an intermediate hashed key from the first token, (ii) generating an intermediate concatenated value by concatenating the intermediate hashed key with the second token, and (iii) applying a cryptographic hash function to the intermediate concatenated value to create the candidate hashed key.

In some embodiments, such as when a hashed key is generated by applying a perfect hash function, the respective hashed key may be in a set of hashed keys that is smaller in quantity than a maximum number of possible values of the first field. In some examples, the secure index does not include sufficient information to completely recover the personally identifiable information.

In one embodiment, a system for preparing a secure search index for securely detecting personally identifiable information may include at least one physical processor and physical memory that includes computer-executable instructions that, when executed by the physical processor, cause the physical processor to (i) receive a dataset including a record, where the record has a field including a value describing personally identifiable information and (ii) perform a security action. In some examples, the security action may include (i) generating, using a perfect hash function, a respective hashed key from the value and (ii) adding, to the secure search index (a) the respective hashed key or (b) a subsequent hashed key created from the respective hashed key.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, by the computing device, a dataset including a record, where the record has a field including a value describing personally identifiable information and (ii) perform, by the computing device, a security action. In some examples, the security action may include (i) generating, using a perfect hash function, a respective hashed key from the value and (ii) adding, to a secure search index (a) the respective hashed key and/or (b) a subsequent hashed key created from the respective hashed key.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 4 depicts a non-limiting example dataset of source data.

FIGS. 5-13 depict a non-limiting example implementing shift-split perfect hashing to create a secure search index.

FIG. 15 depicts a non-limiting example of an intersection attack on hash values calculated using shift-split perfect hashing.

Figure 1:
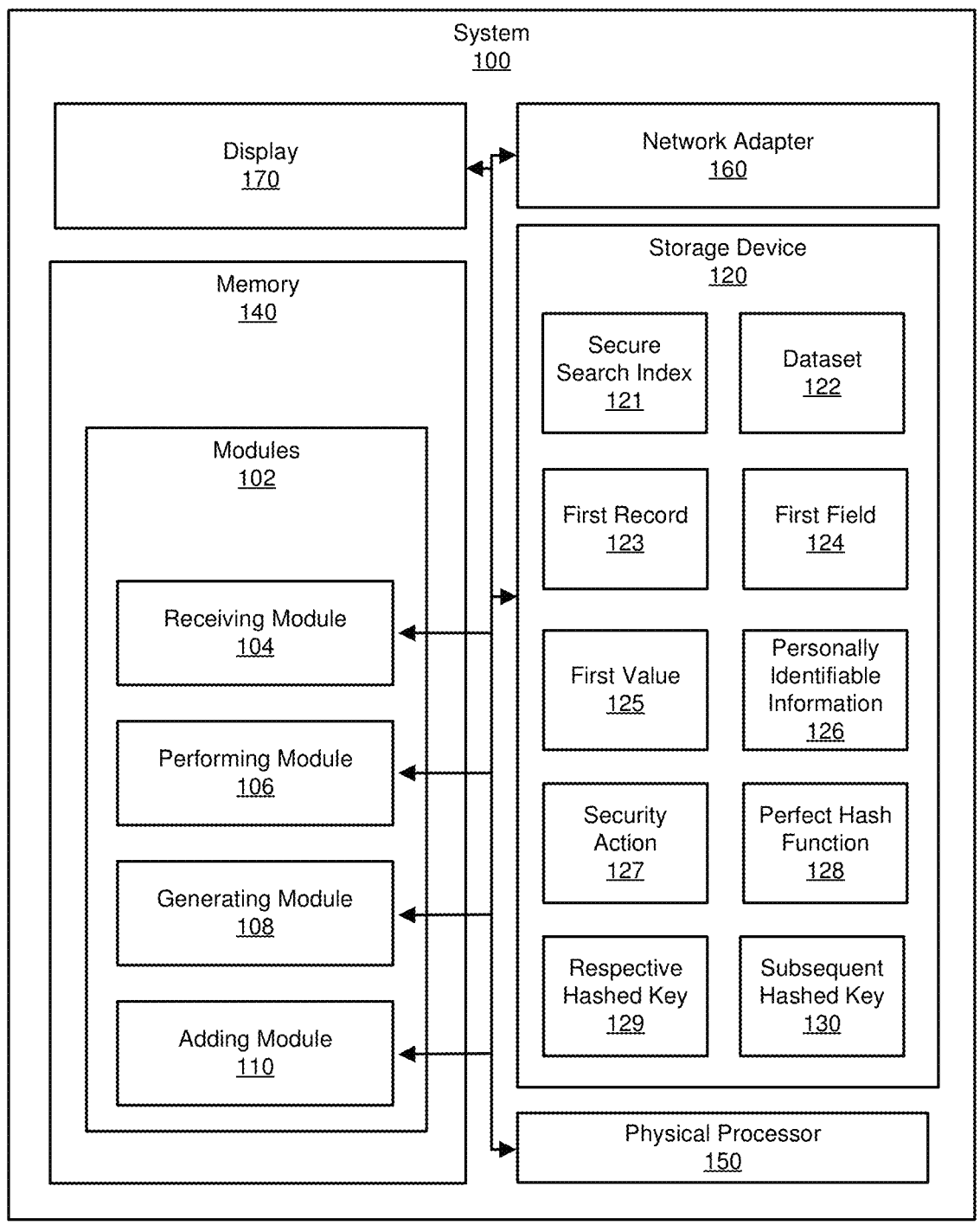
FIG. 1 is a block diagram of an example system for preparing a secure search index for securely detecting personally identifiable information.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for preparing a secure search index for securely detecting personally identifiable information (PII) and using the secure search indices to securely detect PII in documents. In some examples, provided are systems and methods that may be used by untrusted entities to detect PII in manners that beneficially reduce a quantity of PII information exposed to the untrusted entities, when compared to conventional techniques. In some embodiments, untrusted entities may use secure search indices to detect PII in documents.

By doing so, the systems and methods described herein may advantageously improve the security of computing devices and/or provide targeted protection against malware and/or malicious users. As such, the provided techniques may protect users by beneficially reducing security risks posed by malicious processes and/or malicious users. In some embodiments, the provided techniques may advantageously protect PII from unauthorized disclosures. In examples, the provided techniques may advantageously protect PII from unauthorized disclosures to and/or by untrusted entities. In some examples, the systems and methods described herein may advantageously render attacks (e.g., brute force attacks) on secure search indices ineffective, even if attackers have different versions of the secure search indices. In some examples, the provided secure search indices are advantageously secure, even when attackers have access to related cryptographic keys. In some examples, the systems and methods described herein may advantageously provide highly accurate and high-performing index-based PII detection. In some examples, the systems and methods described herein may advantageously have a reduced memory footprint when compared to other PII detection techniques.

PII Detection

In example PII detection scenarios, lists of records may be provided, with each record including one or more PII identifiers of sensitive materials such as a passport number, a social security number and/or an account number, and one or more non-sensitive identifying fields such as first name, last name, and/or zip code. Query text may also be provided. Detection schemes may then detect which PII records from the lists appear either partially or fully in the query text. For a record to be considered as appearing in the text (i) at least one sensitive identifier and one non-sensitive field must be in the text within a prescribed token distance, (ii) multiple sensitive identifiers must be in the text within a prescribed token distance, or (iii) both. In some examples, it may be acceptable for detection schemes to have some small known false positive rate, meaning in some rare instances detection schemes will detect PII where no PII is present. False negatives, meaning not detecting PII present in both the list and the query text, may not be acceptable.

Perfect Hash Functions

The provided techniques may make extensive use of perfect hash functions. Perfect hash functions may be defined as follows:

Given a set of values S from a universe of values U and an integer key range $K=[1 \ldots m]$ such that $m \geq |S|$, a function $f: U \to K$ is a perfect hash function with respect to S if $\forall s_1, s_2 \in S: s_1 \neq s_2 \Rightarrow f(s_1) \neq f(s_2)$. In other words, a perfect hash function maps a given subset of the universe of values into the key range without collisions.

In the context of PII detection, the provided techniques may use a perfect hash function to map the sensitive identifier values to a key space much smaller than the identifier value range, but sufficiently large to uniquely identify each record in the PII record list. For example, given a list of 100,000 records each containing a unique social security number and a last name that may not be unique, the provided techniques may use a perfect hash function that maps all 100,000 SSNs in the list to the key range [1 . . . 1,000,000] without collision. Each key in the range either uniquely identifies a record in the list, because the function maps keys to SSNs in the list without collision and SSNs in the list are unique, or a key may not map to any record since there may be 1,000,000 possible keys but only 100,000 records in the list.

The provided techniques may use perfect hash keys in lieu of their respective sensitive identifier values in each record in any PII detection scheme that meets the requirements specified herein (for example, the PII detection scheme described in U.S. Pat. No. 9,971,809, which is incorporated by reference herein in its entirety), knowing that perfect hash keys may be sufficiently informative to distinguish the records from each other, but that perfect hash keys do not provide an attacker with sufficient information to recover the sensitive identifier values because the key range of the function may be much smaller than the range of sensitive identifier values. In the example above, the key range may be about 900 times smaller than the value range (there are about 900,000,000 possible SSNs), meaning that if an attacker can recover the perfect hash key, the attacker can narrow down the possible values of the sensitive identifier to a set of, on average, 900 values, which in most cases may be practically useless. This provides a higher level of security than encryption or cryptographic hash-based schemes because the perfect hash function stores only partial information on the sensitive identifiers, and therefore the full sensitive identifier cannot be recovered from the perfect hash function, regardless of the knowledge or computing power available to an attacker.

Intersection Attack

Protecting the sensitive identifiers underlying the perfect hash function becomes more challenging when the provided techniques account for updates of the PII record list. It is inherent in a perfect hash function that when values are added to the collision-free set, the mapping of values to keys changes. In an example, the concept of a bucket B as it relates to a perfect hash function $f: U \to K$ can be defined as follows: For $u \in U$, define u's bucket $B_u = \{v \in U: f(v) = f(u)\}$. With this definition, and defining $f: U \to K$ and $f': U \to K$ as perfect hash functions with collision-free sets S and S' respectively, for some $s \in \backslash S$ and $t \in S$, if $s \in B_t$ under $f$, then in order to retain the no-collision property of the perfect hash function, $B_t$ under $f'$ must be different from $B_t$ under $f$. At the very least, $s \notin B_t$ under $f'$. In some examples, buckets may be sets of possible values all mapped to a respective key.

This property gives rise to an opportunity for a potential attack on a PII detection scheme implementing a perfect hash function, such as an intersection attack. To launch an intersection attack requires assuming an attacker is able to obtain the list of possible sensitive identifier values for a known identity. Since non-sensitive field values such as first name and last name may be publicly accessible, it is feasible for an attacker, for example, to iterate over all possible social security numbers (SSNs) with a first and last name pair known to be in the list of records and process the results of the iteration with the PII detection algorithm. At the end of this process, the attacker may have, using the definition above, the values in the bucket containing the true SSN for the given first and last name pair (and possibly some additional "noise" due to false positives generated by the PII detection algorithm). In an example, a list of the values in the bucket containing the true SSN for the given first and last name pair may have, on average, 900 SSNs, rendering the list practically useless. If, however, the attacker is able to perform this search again on a different version of the perfect hash function that also contains information about the same person whose first and last name are being used, and if the intersection between the two buckets found in this way contains a single SSN, that SSN is the true SSN for the first name and last name pair.

In general, if an attacker has access to two versions of the perfect hash function $f_1$, $f_2$ with collision-free sets $S_1, S_2$ respectively, and, using some mechanism can calculate $B_{s_1}, B_{s_2}$ the buckets for some unknown value $s \in S_1 \cap S_2$ under $f_1$ and $f_2$ respectively, and $|B_{s_1} \cap B_{s_2}| = 1$ then $B_{s_1} \cap B_{s_2} = \{s\}$.

In some examples, when values are added to a collision free set of a hash function and the values already belong to a bucket of an existing value, the new and existing values may be assigned new buckets essentially randomly, and so the scenario described above, where the intersection between buckets of a value under different version of the hash function is of size 1, is quite common. A non-limiting example of an intersection attack is described herein with reference to FIG. 14.

Basic Perfect Hashing Scheme

The provided techniques introduce a basic perfect hashing scheme and then show a novel technique to augment the perfect hashing scheme in order to dramatically reduce the probability of introducing values vulnerable to intersection attacks when generating a subsequent version of the perfect hash function.

In some examples, the provided basic perfect hash algorithm may be modeled after an open addressing hash table. The provided techniques may use a sequence of pairwise-independent hash functions $h_i$ taken mod m to map values to keys. For every value, the provided techniques calculate the hash functions in sequence until reaching a key that is unoccupied. That unoccupied key is the key of the value under the perfect hash function. When a collision occurs, the key where the collision occurred is marked as blocked and the value that was assigned to that now-blocked key is added to the list of values to be added to the perfect hash function. For each value, the provided techniques keep track of the last hash function used to calculate the key of the respective value, so that if the respective value is returned to the list of values to be added to the perfect hash function, the provided techniques continue calculating keys from the next hash function in the sequence.

In some examples, the following pseudo-code describes an algorithm that determines the blocked keys:

```
calculate_blocked_keys(
  h[ ]: Sequence of pairwise independent hash functions,
  m: Number of keys,
  l[ ]: List of values for which the perfect hash function should have
    no collisions
)
  p[ ] ← Stack ofpending values. Initialized empty
  M[ ] ← Map of keys to pairs of value and next hash function index.
    Initialized empty
  B[ ] ← Set of blocked keys. Initialized empty
  for each value v in l[ ]:
    push [v, 0] onto p
    while p is not empty:
      pop top of p to [v, i]
      k ← h[i](v) mod m
      if M[k] is empty:
        M[k] ← [v, i + 1]
      else if M[k] is BLOCKED:
        push[v, i + 1] onto p
      else:
        push [v, i + 1] onto p
        push [M[k][0], M[k][1] + 1] onto p
        M [k] ← BLOCKED
      insert k into B
  return B
```

In some examples, calculating the perfect hash for a value requires the sequence of hash functions and the set of blocked keys. To calculate the perfect hash, the provided techniques may apply the hash functions in sequence until an unblocked key is reached. That unblocked key is the respective perfect hash key for the value.

In some examples, the following pseudo-code describes an algorithm that calculates the hash key:

calculate_hash(
  v: Value to hash,
  h[ ]: Sequence of pairwise independent hash functions,
  m: Number of keys,
  B[ ]: Set of blocked keys)
)
  for each h in h[ ]:
    k=h(v) mod m
    if k not in B:
      return k
  return sentinel key It may be possible, though exceedingly unlikely given a sufficiently long sequence of hash functions, that a value not in the collision free set for the perfect hash function will yield a blocked key for every function h in the hash function sequence. By the construction of the perfect hash function, this case can only happen to values that are not in the collision free set, and therefore the provided techniques can return an arbitrary sentinel key value from the set of keys in this case without impacting the collision free property of the perfect hash function. The probability of this case happening for a sequence of n hash functions and a blocked key ratio of $\beta$ is $\beta^{-n}$.

Shift-Split Hashing

The provided techniques and algorithms provide simple and straightforward ways for generating a perfect hash function. In some examples it may be beneficial to mitigate intersection attacks. To mitigate intersection attacks, in some embodiments the provided techniques may use a sequence of hash functions that specifically keeps values mapped to the same key (e.g., in the same bucket) together, while still separating colliding values (e.g., changes to the collision-free set) at a high probability. This aspect of the provided techniques is named "Shift-Split Hashing."

Shift-Split hashing may use a hash function sequence defined as follows:

$$h_{i(x)} := \begin{cases} H(x) \bmod m & i = 0 \\ H(x) + s_i + p_i \cdot bit_i(H(x)) \bmod m & i > 0 \end{cases}$$

Where:

H: $U \to \mathbb{Z}^+ \cup \{0\}$—A pairwise independent hash function.

$bit_i(k)$: $\mathbb{Z}^+ \cup \{0\} \to [0,1]$—The $i^{th}$ bit in the binary representation of k. Depending on the requirements of the specific application the provided techniques may use a fixed length zero-padded binary representation (e.g. 64 bits or 128 bits).

$s_i, p_i \in [1 \ldots m-1]$—Random offsets selected uniformly. The shift offset ($s_i$) and split offset ($p_i$) respectively. A shift offset ($s_i$) is a number of keys to move a value from a first key to a second key to avoid a collision. A split offset ($p_i$) may split a bucket into two portions that may be substantially equal in size, dependent upon the value of $bit_i(H(x))$. In some examples, the bit used to determine whether or not to add the split offset comes from a binary representation of the base hash function of the value in question. In some examples, splitting buckets may cause intersection attacks to yield multiple values. If the value of $bit_i(H(x))$ is zero, then the offset is not added and if the value of $bit_i(H(x))$ is one, then the offset is added. Thus, substantially one-half of the values in the bucket may be moved by the split offset and the remaining values in the bucket may be left at the shift offset. The value of modulo m can be larger than the collision-free set.

In order to avoid cyclical behavior in the generation of the hash keys, the shift offset ($s_i$) and split offset ($p_i$) must be pairwise relatively prime to the modulo m so the provided techniques choose m prime. In an example, hash keys may be always calculated modulo the size of the codomain of the perfect hash function, while base hash values may not always be calculated modulo the size of the codomain of the perfect hash function.

In an example, a number of hash functions available to use may be substantially 100 (i.e., i={0, 1, 2, 3 . . . 99}. In a non-limiting example implementation, it is extremely unlikely that the number of hash functions used will exceed 100.

Figure 2:
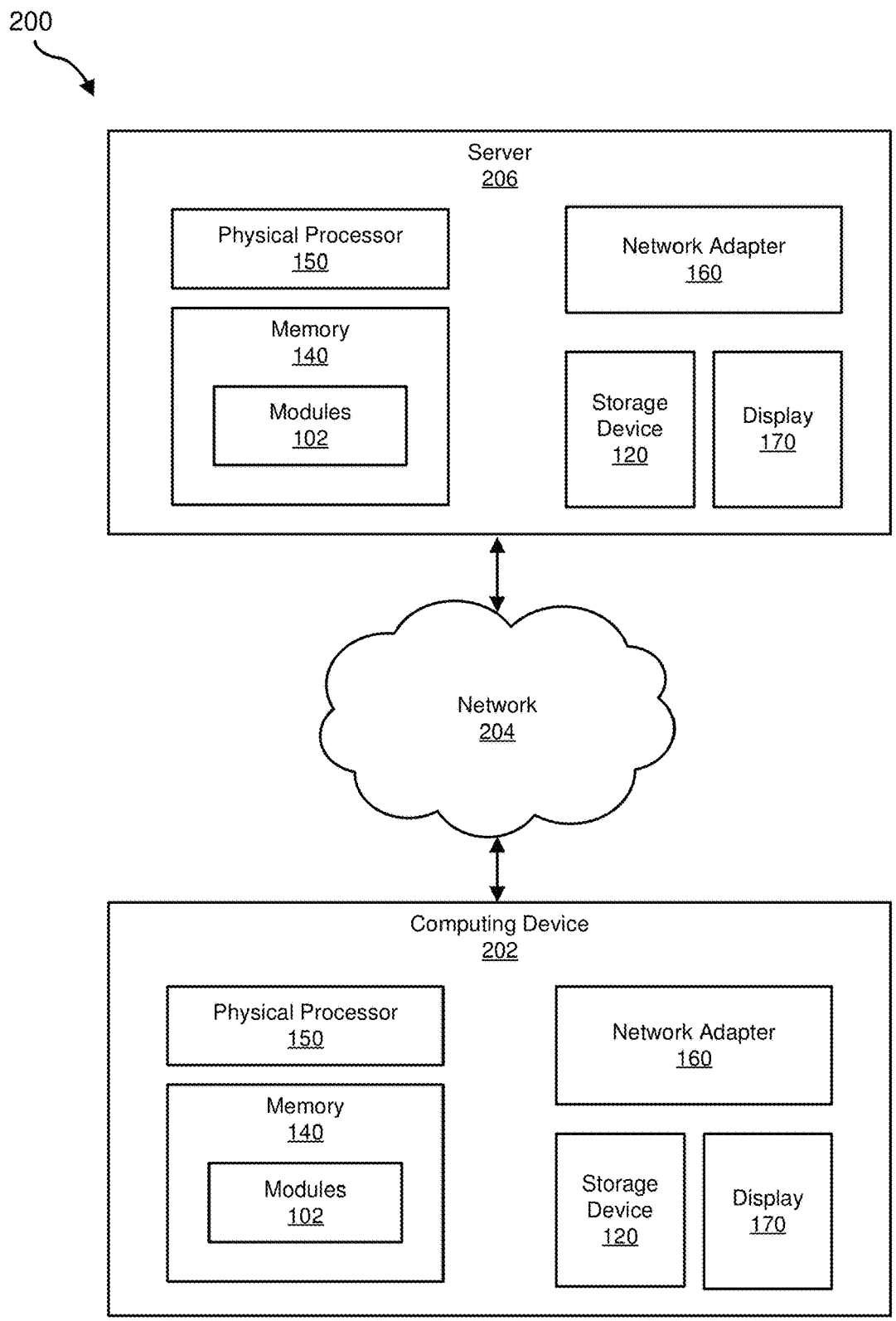
FIG. 2 is a block diagram of an additional example system for preparing a secure search index for securely detecting personally identifiable information.

The following will provide, with reference to FIGS. 1-2, detailed descriptions of example systems for preparing a secure search index for securely detecting personally identifiable information. Detailed descriptions of corresponding computer-implemented methods will also be provided in connection with FIG. 3-13. Detailed descriptions of intersection attacks will also be provided in connection with FIG. 14-15. In addition, detailed descriptions of an example computing system and network architecture capable of implementing one or more of the embodiments described herein are provided in connection with FIGS. 16 and 17, respectively.

FIG. 1 is a block diagram of an example system 100 for preparing a secure search index for securely detecting personally identifiable information. As illustrated in this figure, example system 100 may include one or more modules 102 for performing one or more tasks. As will be explained in greater detail below, modules 102 may include a receiving module 104, a performing module 106, a generating module 108, and an adding module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of characteristics of a secure search index 121, a dataset 122, a first record 123, a first field 124, a first value 125, personally identifiable information (PII) 126, a security action 127, a perfect hash function 128, a respective hashed key 129, and/or a subsequent hashed key 130. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 150. Physical processor 150 generally represents any type or form of hardware-implemented processing unit capable of interpreting and/or executing computer-readable instructions. In one example, physical processor 150 may access and/or modify one or more of modules 102 stored in memory 140. Additionally or alternatively, physical processor 150 may execute one or more of modules 102 to facilitate preparing a secure search index for securely detecting personally identifiable information. Examples of physical processor 150 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more network adapters, such as network adapter 160. In some examples, network adapter 160 may be a physical network adapter connected to a physical network (e.g., network 204 in FIG. 2).

As illustrated in FIG. 1, example system 100 may also include one or more display devices, such as display 170. Display 170 generally represents any type or form of device capable of visually displaying information (e.g., to a user). In some examples, display 170 may present a graphical user interface (e.g., to enable user interaction with system 100). In non-limiting examples, display 170 may present information indicating one or more of characteristics of at least a portion of secure search index 121, dataset 122, first record 123, first field 124, first value 125, personally identifiable information 126, security action 127, perfect hash function 128, respective hashed key 129, and/or subsequent hashed key 130. In some examples, display 170 may be a touch-screen device configured to display a user interface and/or receive user input.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204.

In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to prepare a secure search index for securely detecting PII. For example, and as will be described in greater detail below, one or more of modules 102 may cause computing device 202 and/or server 206 to (i) receive a dataset including a record, where the record has a field including a value describing personally identifiable information and (ii) perform a security action. In some examples, the security action may include generating, using a perfect hash function, a respective hashed key from the value. In some examples, the security action may include adding the respective hashed key to the secure search index. In some embodiments, the security action may include adding a subsequent hashed key created from the respective hashed key to the secure search index. In an example, at least a portion of the secure search index may be sent from computing device 202 and/or server 206 to a computing device that is accessible by an untrusted entity. In an example, at least a portion of the secure search index may be sent from computing device 202 and/or server 206 to a computing device on which PII may be detected using the secure search index.

Computing device 202 generally represents any type or form of computing device capable of reading computer-executable instructions. In some examples, computing device 202 may represent a computer running security software, such as cybersecurity software and/or privacy software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that may be capable of reading computer-executable instructions. In some examples, server 206 may represent a computer running security software, such as cybersecurity software and/or privacy software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Figure 3:
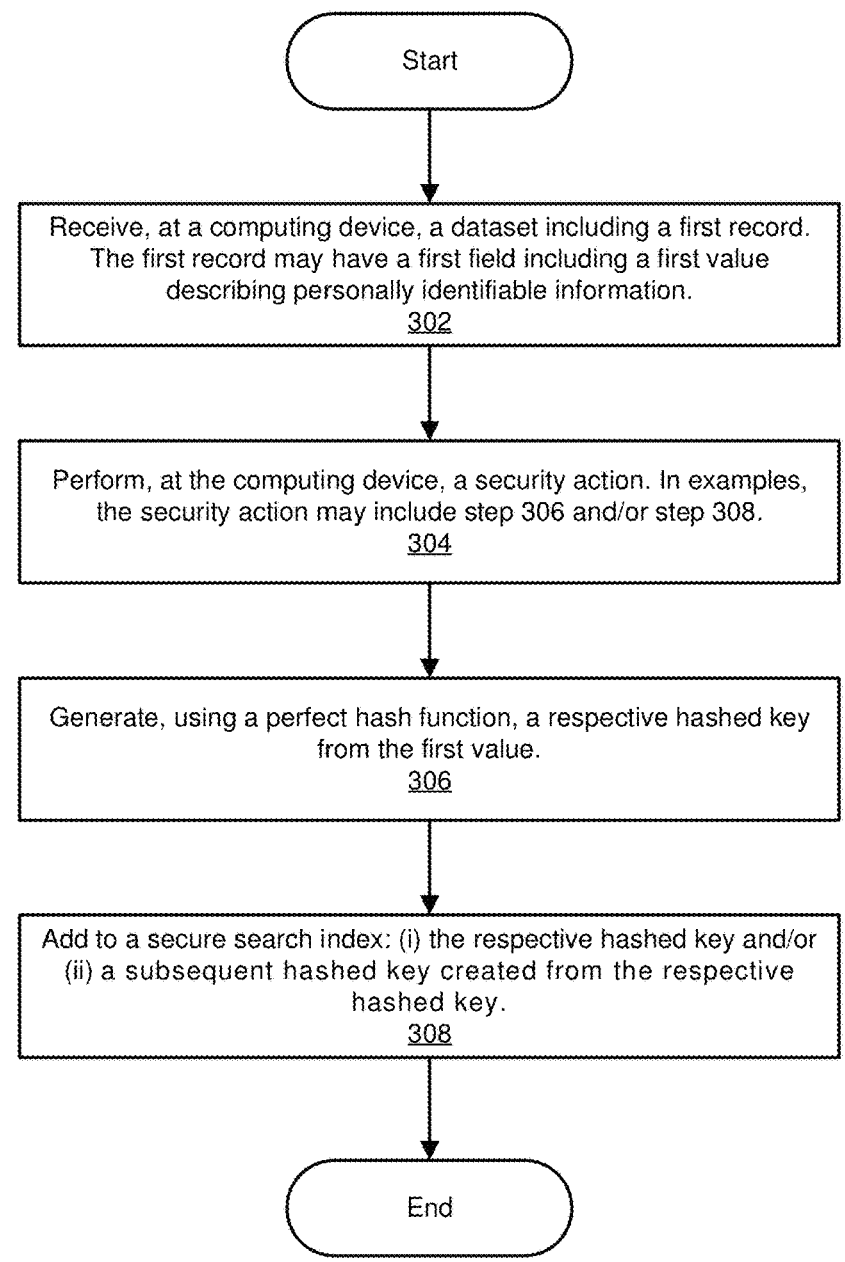
FIG. 3 is a flow diagram of an example method for preparing a secure search index for securely detecting personally identifiable information.

FIG. 3 is a flow diagram of an example computer-implemented method 300 for preparing a secure search index for securely detecting personally identifiable information. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive (e.g., at a computing device such as system 100) a dataset including a first record. The dataset may include PII and/or other sensitive data. In some examples, the first record may have a first field including a first value describing personally identifiable information.

In an embodiment, the first column may be a "key column" including information (e.g., PII) that conforms to an identifiable format. In a non-limiting example, key column information may be formatted in a nine-digit social security number format (xxx-xx-xxxx). The perfect hashing techniques provided herein may be applied to key column information to form at least a portion of a secure search index.

The systems described herein may perform step 302 in a variety of ways. For example, receiving module 104 may, as part of computing device 202 and/or server 206 in FIG. 2, receive dataset 122 including first record 123. In some examples, first record 123 may have first field 124 including first value 125 describing personally identifiable information 126.

In some examples, the first value may include PII. In some embodiments, the first value may include a social security number. FIG. 4 depicts a non-limiting example dataset of source data including SSNs in a first field (e.g., the first column in FIG. 4). In the example of FIG. 4, the first field has a format that may be distinct from the other fields and includes data that does not have repeating values. In some examples, fields in that dataset may be called a "key-column" for having substantially unique values and a distinct format. We now return to FIG. 3.

The term "personally identifiable information" (PII) as used herein, generally refers to information that may identify a specific person. In some non-limiting examples, PII may be any combination of information that may identify a specific person and that a user and/or company would not want sent outside of a computing device or system without knowledge and/or permission of the user and/or company. Examples of PII may include, without limitation, a name, a phone number, a device identifier, an email address, contact information, a browser history, a browser cookie, a phone history, a message history, location information (e.g., global positioning system information), financial information (e.g., credit card numbers, bank account numbers, etc.), confidential information, privileged information, a social security number, a driver's license number, and/or computing device usage information. In some examples, data may be considered PII if the data is included within a same context with other PII. For example, information (e.g. a single social security number with no additional context) may be considered PII when the information is contained in the same context with other PII (e.g., a social security number of a person and at least a portion of a name of a person in the same paragraph).

As illustrated in FIG. 3, at step 304 one or more of the systems described herein may perform (e.g., at the computing device) a security action. In examples, the security action may include step 306 and/or step 308. The systems described herein may perform step 304 in a variety of ways. For example, performing module 106 may, as part of computing device 202 and/or server 206 in FIG. 2, perform security action 127.

As illustrated in FIG. 3, at step 306 one or more of the systems described herein may generate, using a perfect hash function, a respective hashed key from the first value. The systems described herein may perform step 306 in a variety of ways. For example, generating module 108 may, as part of computing device 202 and/or server 206 in FIG. 2, generate, using perfect hash function 128, respective hashed key 123 from first value 125.

In some embodiments, generating the respective hashed key may further include (i) generating, using a base hash function, a first hashed key from the first value, (ii) detecting a collision between the first hashed key and a second hashed key already in a set of valid hash values, (iii) blocking, responsive to the collision, the first hashed key and the second hashed key (which both are the same when a collision occurs between these hashed keys) from use in the set of valid hash values, (iv) generating a third hashed key from the base hash function, a first shift value, a first split value, and a value of a first bit in a binary representation of the base hash function applied to the first value, (v) generating a fourth hashed key from the base hash function, the first shift value, the first split value, and a value of a first bit in a binary representation of the base hash function applied to the second value, and (vi) when the third hashed key and the fourth hashed key are different (a) adding the third hashed key and the fourth hashed key to the set of valid hash values and (b) using the third hashed key as the respective hashed key.

In some examples, the method may further include generating, using the base hash function, the second hashed key from a second value from a first field of a second record. In an example, the first shift value and the first split value may be random numbers. In some embodiments, the method may further include (i) randomly selecting a base value and (ii) generating the first shift value, the first split value, a subsequent shift value, and a subsequent split value by repeatedly applying a cryptographic hash function to the base value. In some embodiments, the method may further include storing the blocked first hashed key and the blocked second hashed key.

In some embodiments, the respective hashed key may be in a set of hashed keys that may be smaller in quantity than a maximum number of possible values of the first field.

As illustrated in FIG. 3, at step 308 one or more of the systems described herein may add to a secure search index: (i) the respective hashed key and/or (ii) a subsequent hashed key created from the respective hashed key. The systems described herein may perform step 308 in a variety of ways. For example, adding module 110 may, as part of computing device 202 and/or server 206 in FIG. 2, may add to secure search index 121: (i) respective hashed key 129 and/or (ii) subsequent hashed key 130 created from respective hashed key 129. In some embodiments, full source data (i.e., complete information about the value of the sensitive identifier) is not stored in secure search indices.

In some examples, the method may further include (i) detecting a collision between the third hashed key and the fourth hashed key, (ii) blocking, responsive to the collision, the third hashed key and the fourth hashed key (which both are the same when a collision occurs between these hashed keys) from use in the set of valid hash values, (iii) generating a fifth hashed key from the base hash function, a second shift value, a second split value, and a value of a second bit in a binary representation of the base hash function applied to the first value, (iv) generating a sixth hashed key from the base hash function, the second shift value, the second split value, and a value of a second bit in a binary representation of the base hash function applied to the second value, and (v) when the fifth hashed key and the sixth hashed key are different (a) adding the fifth hashed key and the sixth hashed key to the set of valid hash values and (b) using the fifth hashed key as the respective hashed key. In an embodiment, the second shift value and the second split value may be random numbers.

FIGS. 5-13 depict a non-limiting example implementing shift-split perfect hashing to create a secure search index.

Figure 5:
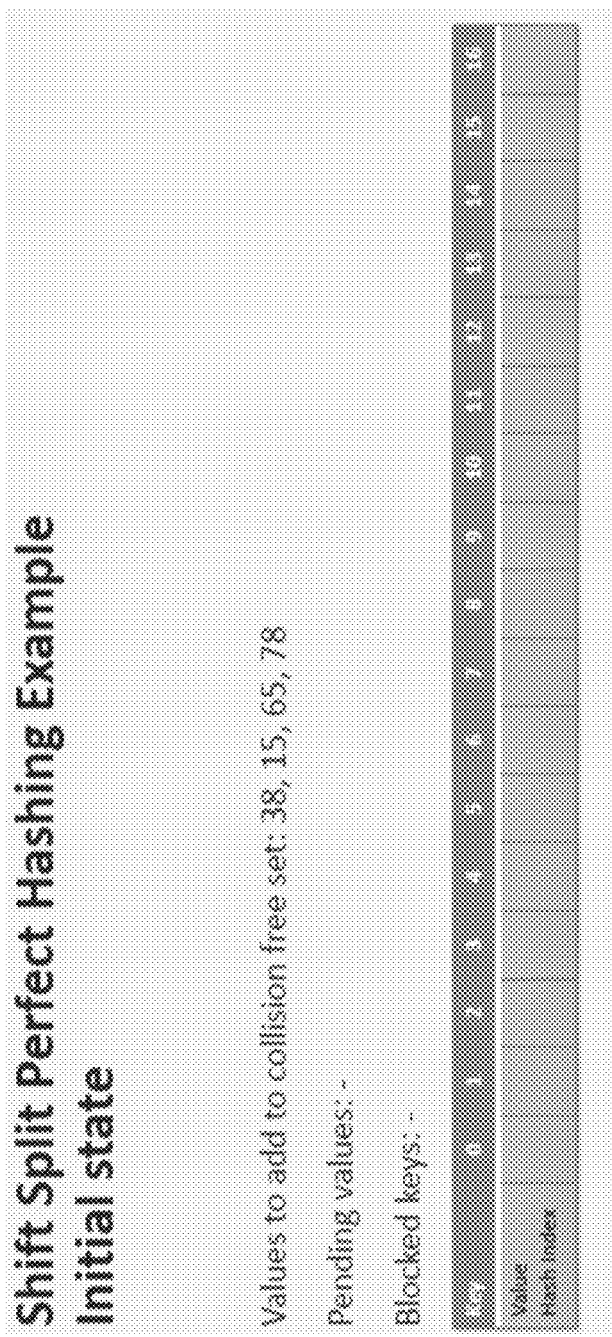

FIG. 5 depicts an initial state 500 in which m=17 because seventeen keys (numbered 0-16) are present. In this example, source data values 38, 15, 65, and 78 are to be added to the collision-free set.

FIG. 6 depicts a step 600 in which value 38 is added with key 8 using a hash function having index number zero (i=0). Calculating the perfect hash of 38 yields key 8. In some examples, the index number of the hash function in the sequence may be tracked.

FIG. 7 depicts a step 700 in which value 15 is added with key 11 using the hash function having index number zero (i=0).

Figure 8:
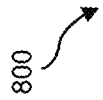

FIG. 8 depicts a step 800 in which value 65 is added with key 7 using the hash function having index number zero (i=0). Following adding value 65, there are no collisions.

Figure 9:
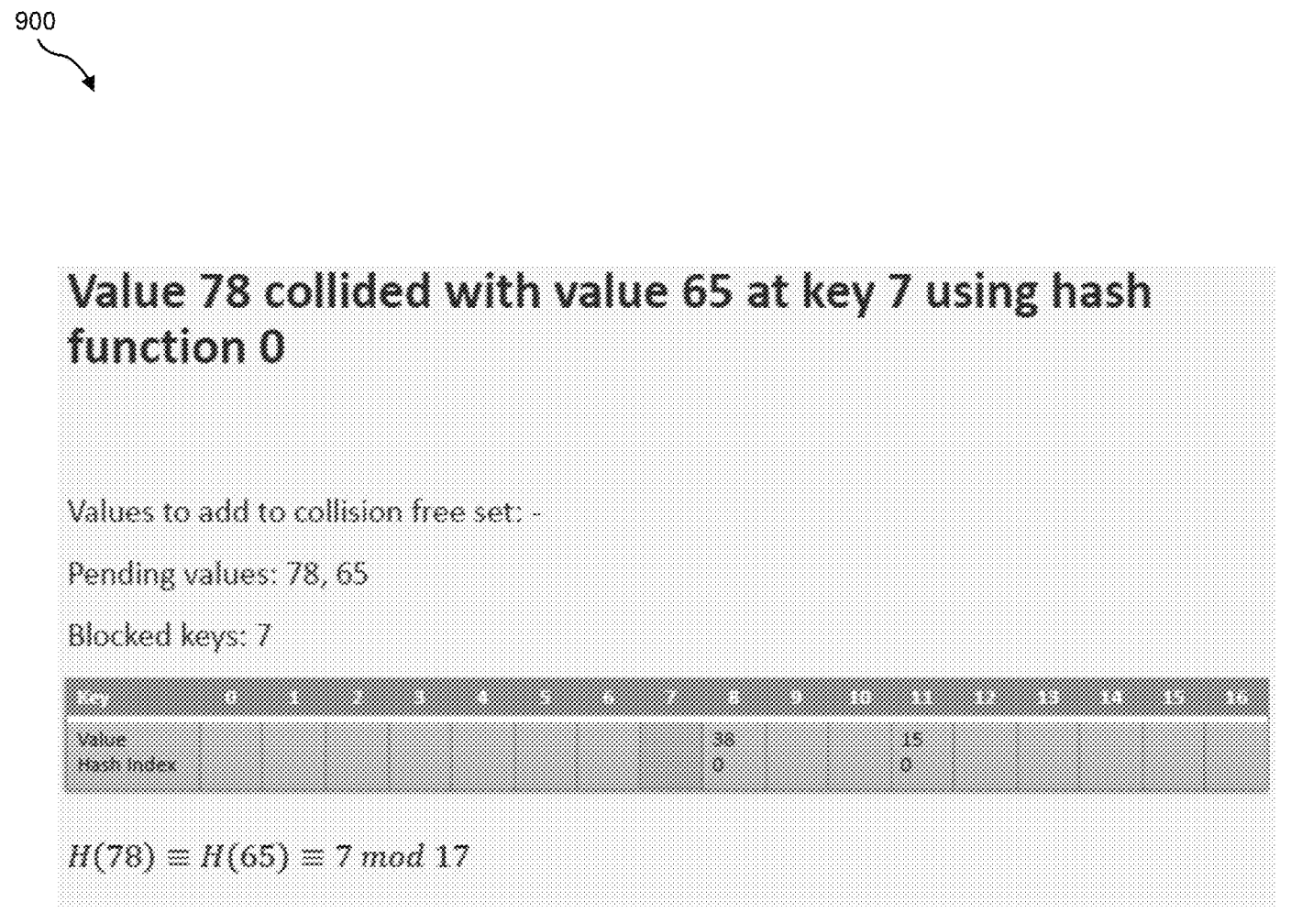

FIG. 9 depicts a step 900 in which value 78 collides with value 65 at key 7 using the hash function having index number zero (i=0). As a result of the collision, value 65 is removed from key 7 and new keys are to be determined for values 78 and 65. Also as a result of the collision, collided key 7 is blocked (i.e., not to be used).

FIG. 10 depicts a step 1000 in which value 78 is added with key 13 using the hash function having index number one (i=1). The shift offset is randomly selected to equal four ($s_i=4$) and the split offset equals two ($p_i=2$). The $bit_i(H(x))$ is one, thus the split offset is added. The base hash key is key 7. Applying these values yields new key 13 from 7+4+(2*1). Following adding value 78, there are no collisions.

FIG. 11 depicts a step 1100 in which value 65 collides with value 78 at key 13 using the hash function having index number one (i=1). As a result of this second collision, value 78 is removed from key 13 and new keys are to be determined for values 78 and 65. Also as a result of the collision, collided key 13 is blocked (i.e., not to be used). In some examples, there may be about a 50% probability of second collisions, depending on values of bits in the hash function.

FIG. 12 depicts a step 1200 in which value 65 is added with key 12 using the hash function having index number two (i=2). The shift offset is randomly selected to equal five ($s_i=5$) and the split offset equals six ($p_i=6$). The $bit_i(H(x))$ is zero, thus the split offset is not added. The base hash key is key 7. Applying these values yields new key 12 from 7+5+(6*0). Following adding value 65, there are no collisions.

FIG. 13 depicts a step 1300 in which value 78 is added with key 1 using the hash function having index number two (i=2). The shift offset may be randomly selected to equal five ($s_i=5$) and the split offset equals six ($p_i=6$). The $bit_i(H(x))$ is one, thus the split offset is added. The base hash key is key 7. Applying these values yields new key 18 from 7+5+(6*1), which in turn yields new key 1, as m=17 and 18 mod 17=1. Following adding value 78, there are no collisions and no more values to add to the collision-free set. Values 65 and 78 are added to different keys because determining a key for value 78 includes adding the split offset, while determining a key for value 65 does not include adding the split offset.

Figure 14:
FIG. 14 depicts a non-limiting example of an intersection attack on hash values calculated by a perfect hash function alone.

FIG. 14 depicts a non-limiting example 1400 of an intersection attack on hash values calculated by a conventional perfect hash function (PHF) alone. In some examples, data sources including PII may change due to personnel turnover, customer turnover, and/or the like. Perfect hash functions have an inherent property that when a collision-free set changes, mapping of values to keys changes. Techniques implementing a conventional perfect hash function alone may yield mapping changes that are essentially random. For example, FIG. 14 shows that social security number (SSN) 111-11-1111 is source data that is assigned key 3 by PHF One and is assigned key 2 by PHF Two. If an attacker obtains the set of all SSNs mapped to the perfect hash key 3 by PHF One and the set of all SSNs mapped to the perfect hash key 2 by PHF Two and calculates the intersection between the two sets, then the attacker may successfully complete an intersection attack and accurately determine source data (i.e., SSN 111-11-1111 as a confirmed SSN in the source data).

FIG. 15 depicts a non-limiting example 1500 of an intersection attack on hash values calculated using shift-split perfect hashing. Hash values calculated using shift-split perfect hashing are advantageously not vulnerable to intersection attacks because respective keys produced by two different shift-split perfect hash functions applied to the same source data will include many common source data values for the same key. Thus, attackers are left with a list of possible source data (e.g., multiple SSNs) instead of a single valid source data value (e.g., one confirmed SSN) and the intersection attack fails.

We now return to FIG. 3.

In an example, provided methods may further include (i) generating a concatenated value by concatenating the respective hashed key with a second value from a second field of the first record, (ii) applying a cryptographic hash function to the concatenated value to create the subsequent hashed key, and (iii) adding the subsequent hashed key to the secure search index. In some examples, the cryptographic hash function may be a Hash Message Authentication Code (HMAC) algorithm. Thus, in some examples, the secure search index may include HMAC (respective hashed key-|second value from a second field of the first record, HMAC key). Accordingly, in some examples, the secure search index does not include the first value (e.g., PII). In some examples, the secure search index does not include PII.

In some examples, the secure search index may be provided to (e.g., sent, distributed, and/or the like) to a computing device that may be accessed by an untrusted entity. In an example, shift-split hashing may be performed on key column information to create a collision-free set. The cryptographic hash function is applied to the perfect hash keys of the values in the collision free set (the collision free set contains the actual sensitive IDs). The perfect hash keys of the values in the collision free set may be concatenated with information from another column in the source data to form a concatenated result and a cryptographic function (e.g., HMAC) may be applied to the concatenated result to prepare hash values that are entered into the secure search index. The cryptographic function is applied individually to the perfect hash key of each value in the collision-free set concatenated with respective (i.e., coming from the same record) information from another column of the source data. If there are multiple columns in the source data that have non-key values, the above process may be performed for each perfect hash key of each value in the collision-free set and the respective values (those from the same record) of each non-key column of the source data. In the non-limiting example given in FIG. 4, the perfect hash key for value 123-45-6789 (namely "7") would be concatenated with "John" to produce the string "7|John" and then the HMAC would be applied to the string "7|John". The same perfect hash key would also be concatenated with "Smith" resulting in the string "7|Smith" and then the HMAC would be applied to the string "7|Smith". Both of these HMAC values are then added to the search index. This process may be executed for each row in the source data to prepare the secure search index.

In some embodiments, the untrusted entity may have access to (i) a document to search for PII, (ii) the base hash algorithm, (iii) an HMAC key, and (iv) a pattern that may be used to look for a format in the document to search for PII.

In some embodiments, trusted entities and/or untrusted entities may use the secure search index to search for PII in datasets, documents, and/or the like. In some embodiments, the method may further include (i) receiving a request to search a document, (ii) extracting a first token and a second token from the document, (iii) generating a candidate hashed key from the first token and the second token, (iv) querying the secure search index to determine whether the candidate hashed key matches any hashed key in the secure search index and (v) responding, upon determining the candidate hashed key matches a hashed key in the secure search index, to the request with information about the document. When the candidate hashed key matches the hashed key in the secure search index, there is a high probability that the searched document includes PII. In an example, (i) values in the first field may follow a known pattern, (ii) the request to search the document may specify the first token is required to be within a specified distance from the second token, and (iii) extracting the first token and the second token from the document may include (a) using the known pattern to identify the first token within the document and (b) identifying the second token within the specified distance from the first token.

In some embodiments, (i) values in the first field may follow a known pattern and (ii) extracting the first token from the document may include using a regular expression based on the known pattern to identify the first token within the document. In some examples, (i) the computing device may be a server-side computing device and (ii) extracting the first token and the second token, generating the candidate hashed key, and querying the secure search index may be performed at a client-side computing device to which the secure search index has been distributed. In an example, generating the candidate hashed key may further include (i) generating, using the perfect hash function, an intermediate hashed key from the first token, (ii) generating an intermediate concatenated value by concatenating the intermediate hashed key with the second token, and (iii) applying a cryptographic hash function to the intermediate concatenated value to create the candidate hashed key. In some embodiments, datasets may be searched in similar manners as documents.

When the candidate hashed key matches the hashed key in the secure search index, there is a high probability that the document includes PII. In some examples, in response to identifying the document includes PII, further security actions may be performed. In some examples, further security actions may include blocking access to devices (e.g., storage devices, memories, network devices, etc.), allowing limited access to devices, allowing read-only access to devices, encrypting information, acts limiting access to devices, acts limiting sending of information, acts limiting sending of an email, acts limiting sending of a request to another computing device, or a combination thereof. In some examples, further security actions may be performed automatically. In some embodiments, further security actions may attempt to identify and/or ameliorate potential security risks. In some examples, further security actions many include blocking access to datasets and/or documents. In additional examples, further security actions may include displaying, on user displays, warnings indicating that dataset and/or documents may include PII.

The term "untrusted entity," as used herein, generally refers to entities, companies, and/or persons who may not be authorized to access certain sensitive information. In some non-limiting examples, the sensitive information may be PII. In some non-limiting examples, untrusted entities may include (i) hosted servers provided by a service provider other than a provider of the sensitive information, (ii) computing devices that may be used by employees, contractors, and/or partners of the provider of the sensitive information, (iii) computing devices operating outside of a network of the provider of the sensitive information, (iv) computing devices operating outside of premises of the provider of the sensitive information, (v) computing devices not under the direct control, operation, and/or management of the provider of the sensitive information, and/or (vi) a combination thereof. In some non-limiting examples, hosted servers provided by a service provider may be owned by the service provider. In some non-limiting examples, the provider of the sensitive information may be an owner of the sensitive information. In some embodiments, examples of untrusted entities may include, without limitation, persons outside of a group of persons who are trusted to access certain sensitive information. In some non-limiting examples, untrusted entities may include employees of contractors and/or subcontractors who develop software to process sensitive information but who may not be authorized to access the sensitive information that the software processes.

In some examples, the secure index does not include sufficient information to completely recover underlying PII, regardless of an amount of time and/or computer resources put to the task. This holds at a high probability, even when an attacker can recover the possible PII values mapped to the hash keys in multiple versions of the search index.

As detailed herein, the steps outlined in method 300 in FIG. 3 may advantageously enable computing devices to improve a state of cybersecurity of target computing devices, potentially resulting in significant time and/or monetary savings. Examples of the provided techniques described herein may improve functioning of a computing device and/or provide targeted protection against malware, and thus improve fields of malware protection in general, by providing methods for preparing a secure search index for securely detecting personally identifiable information. In some examples, provided are systems and methods that may detect, by untrusted entities, PII in manners that beneficially reduce PII information exposed to the untrusted entities when compared to conventional techniques. Thus, in some embodiments, the provided techniques may advantageously protect PII from unauthorized disclosures to and/or by untrusted entities.

Figure 16:
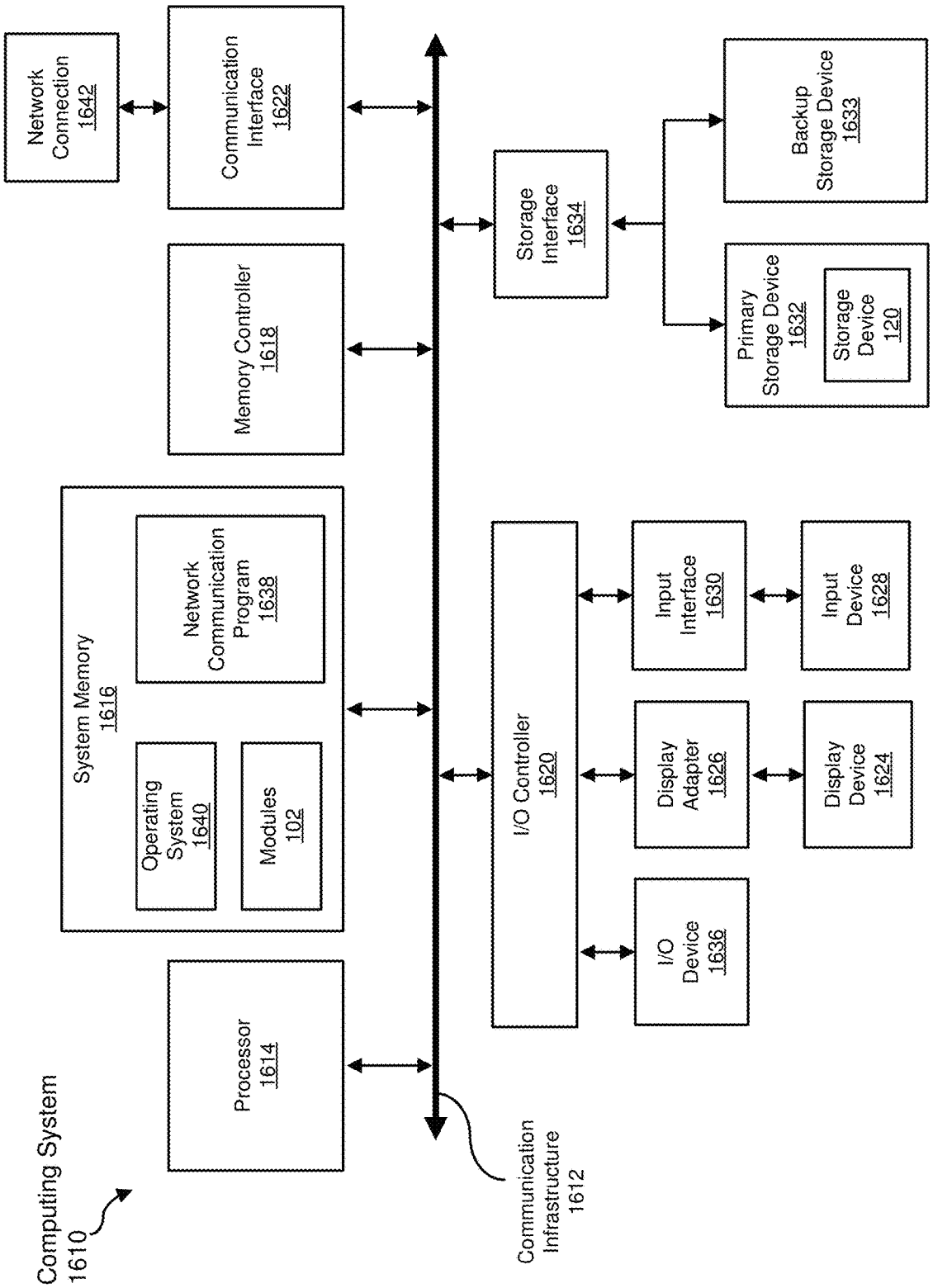
FIG. 16 is a block diagram of an example computing system capable of implementing one or more of the embodiments described and/or illustrated herein.

FIG. 16 is a block diagram of an example computing system 1610 capable of implementing one or more of the embodiments described and/or illustrated herein. For example, all or a portion of computing system 1610 may perform and/or be a means for performing, either alone or in combination with other elements, one or more of the steps described herein (such as one or more of the steps illustrated in FIG. 3). All or a portion of computing system 1610 may also perform and/or be a means for performing any other steps, methods, or processes described and/or illustrated herein.

Computing system 1610 broadly represents any single or multi-processor computing device or system capable of executing computer-readable instructions. Examples of computing system 1610 include, without limitation, workstations, laptops, client-side terminals, servers, distributed computing systems, handheld devices, or any other computing system or device. In its most basic configuration, computing system 1610 may include at least one processor 1614 and a system memory 1616.

Processor 1614 generally represents any type or form of physical processing unit (e.g., a hardware-implemented central processing unit) capable of processing data or interpreting and executing instructions. In certain embodiments, processor 1614 may receive instructions from a software application or module. These instructions may cause processor 1614 to perform the functions of one or more of the example embodiments described and/or illustrated herein.

System memory 1616 generally represents any type or form of volatile or non-volatile storage device or medium capable of storing data and/or other computer-readable instructions. Examples of system memory 1616 include, without limitation, Random Access Memory (RAM), Read Only Memory (ROM), flash memory, or any other suitable memory device. Although not required, in certain embodiments computing system 1610 may include both a volatile memory unit (such as, for example, system memory 1616) and a non-volatile storage device (such as, for example, primary storage device 1632, as described in detail below). In one example, one or more of modules 102 from FIG. 1 may be loaded into system memory 1616.

In some examples, system memory 1616 may store and/or load an operating system 1640 for execution by processor 1614. In one example, operating system 1640 may include and/or represent software that manages computer hardware and software resources and/or provides common services to computer programs and/or applications on computing system 1610. Examples of operating system 1640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 1610 may also include one or more components or elements in addition to processor 1614 and system memory 1616. For example, as illustrated in FIG. 16, computing system 1610 may include a memory controller 1618, an Input/Output (I/O) controller 1620, and a communication interface 1622, each of which may be interconnected via a communication infrastructure 1612. Communication infrastructure 1612 generally represents any type or form of infrastructure capable of facilitating communication between one or more components of a computing device. Examples of communication infrastructure 1612 include, without limitation, a communication bus (such as an Industry Standard Architecture (ISA), Peripheral Component Interconnect (PCI), PCI Express (PCIe), or similar bus) and a network.

Memory controller 1618 generally represents any type or form of device capable of handling memory or data or controlling communication between one or more components of computing system 1610. For example, in certain embodiments memory controller 1618 may control communication between processor 1614, system memory 1616, and I/O controller 1620 via communication infrastructure 1612.

I/O controller 1620 generally represents any type or form of module capable of coordinating and/or controlling the input and output functions of a computing device. For example, in certain embodiments I/O controller 1620 may control or facilitate transfer of data between one or more elements of computing system 1610, such as processor 1614, system memory 1616, communication interface 1622, display adapter 1626, input interface 1630, and storage interface 1634.

As illustrated in FIG. 16, computing system 1610 may also include at least one display device 1624 coupled to I/O controller 1620 via a display adapter 1626. Display device 1624 generally represents any type or form of device capable of visually displaying information forwarded by display adapter 1626. Similarly, display adapter 1626 generally represents any type or form of device configured to forward graphics, text, and other data from communication infrastructure 1612 (or from a frame buffer, as known in the art) for display on display device 1624.

As illustrated in FIG. 16, example computing system 1610 may also include at least one input device 1628 coupled to I/O controller 1620 via an input interface 1630. Input device 1628 generally represents any type or form of input device capable of providing input, either computer or human generated, to example computing system 1610. Examples of input device 1628 include, without limitation, a keyboard, a pointing device, a speech recognition device, variations or combinations of one or more of the same, and/or any other input device.

Additionally or alternatively, example computing system 1610 may include additional I/O devices. For example, example computing system 1610 may include I/O device 1636. In this example, I/O device 1636 may include and/or represent a user interface that facilitates human interaction with computing system 1610. Examples of I/O device 1636 include, without limitation, a computer mouse, a keyboard, a monitor, a printer, a modem, a camera, a scanner, a microphone, a touchscreen device, variations or combinations of one or more of the same, and/or any other I/O device.

Communication interface 1622 broadly represents any type or form of communication device or adapter capable of facilitating communication between example computing system 1610 and one or more additional devices. For example, in certain embodiments communication interface 1622 may facilitate communication between computing system 1610 and a private or public network including additional computing systems. Examples of communication interface 1622 include, without limitation, a wired network interface (such as a network interface card), a wireless network interface (such as a wireless network interface card), a modem, and any other suitable interface. In at least one embodiment, communication interface 1622 may provide a direct connection to a remote server via a direct link to a network, such as the Internet. Communication interface 1622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1622 may also represent a host adapter configured to facilitate communication between computing system 1610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1622 may also allow computing system 1610 to engage in distributed or remote computing. For example, communication interface 1622 may receive instructions from a remote device or send instructions to a remote device for execution.

In some examples, system memory 1616 may store and/or load a network communication program 1638 for execution by processor 1614. In one example, network communication program 1638 may include and/or represent software that enables computing system 1610 to establish a network connection 1642 with another computing system (not illustrated in FIG. 16) and/or communicate with the other computing system by way of communication interface 1622. In this example, network communication program 1638 may direct the flow of outgoing traffic that is sent to the other computing system via network connection 1642. Additionally or alternatively, network communication program 1638 may direct the processing of incoming traffic that is received from the other computing system via network connection 1642 in connection with processor 1614.

Although not illustrated in this way in FIG. 16, network communication program 1638 may alternatively be stored and/or loaded in communication interface 1622. For example, network communication program 1638 may include and/or represent at least a portion of software and/or firmware that is executed by a processor and/or Application Specific Integrated Circuit (ASIC) incorporated in communication interface 1622.

As illustrated in FIG. 16, example computing system 1610 may also include a primary storage device 1632 and a backup storage device 1633 coupled to communication infrastructure 1612 via a storage interface 1634. Storage devices 1632 and 1633 generally represent any type or form of storage device or medium capable of storing data and/or other computer-readable instructions. For example, storage devices 1632 and 1633 may be a magnetic disk drive (e.g., a so-called hard drive), a solid state drive, a floppy disk drive, a magnetic tape drive, an optical disk drive, a flash drive, or the like. Storage interface 1634 generally represents any type or form of interface or device for transferring data between storage devices 1632 and 1633 and other components of computing system 1610. In one example, storage device 120 from FIG. 1 may be at least a portion of primary storage device 1632.

In certain embodiments, storage devices 1632 and 1633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1632 and 1633 may also include other similar structures or devices for allowing computer software, data, or other computer-readable instructions to be loaded into computing system 1610. For example, storage devices 1632 and 1633 may be configured to read and write software, data, or other computer-readable information. Storage devices 1632 and 1633 may also be a part of computing system 1610 or may be a separate device accessed through other interface systems.

Many other devices or subsystems may be connected to computing system 1610. Conversely, all of the components and devices illustrated in FIG. 16 need not be present to practice the embodiments described and/or illustrated herein. The devices and subsystems referenced above may also be interconnected in different ways from that shown in FIG. 16. Computing system 1610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1610. All or a portion of the computer program stored on the computer-readable medium may then be stored in system memory 1616 and/or various portions of storage devices 1632 and 1633. When executed by processor 1614, a computer program loaded into computing system 1610 may cause processor 1614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1610 may be configured as an Application Specific Integrated Circuit (ASIC) adapted to implement one or more of the example embodiments disclosed herein.

Figure 17:
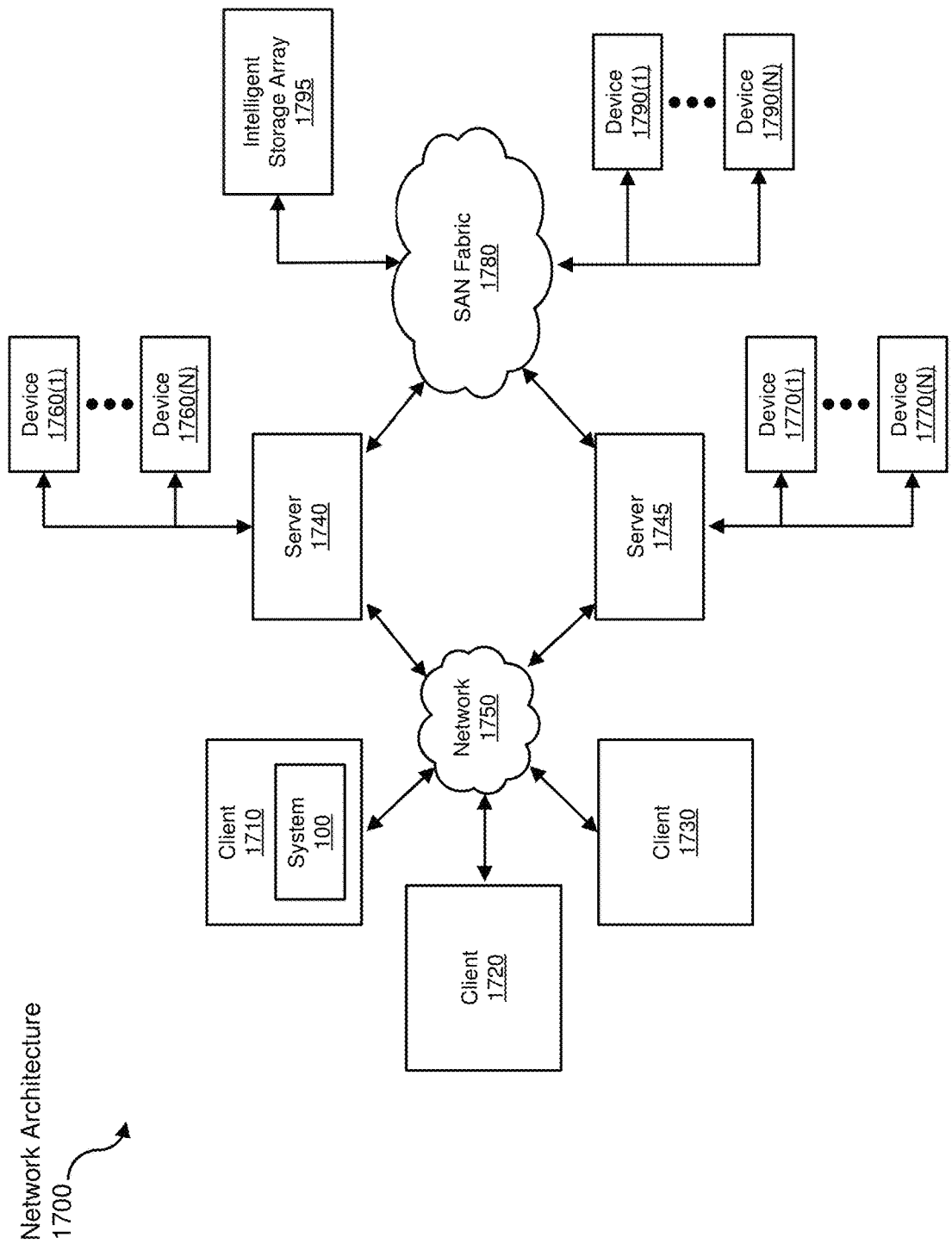
FIG. 17 is a block diagram of an example computing network capable of implementing one or more of the embodiments described and/or illustrated herein.

FIG. 17 is a block diagram of an example network architecture 1700 in which client systems 1710, 1720, and 1730 and servers 1740 and 1745 may be coupled to a network 1750. As detailed above, all or a portion of network architecture 1700 may perform and/or be a means for performing, either alone or in combination with other elements, one or more of the steps disclosed herein (such as one or more of the steps illustrated in FIG. 3). All or a portion of network architecture 1700 may also be used to perform and/or be a means for performing other steps and features set forth in the present disclosure.

Client systems 1710, 1720, and 1730 generally represent any type or form of computing device or system, such as example computing system 1610 in FIG. 16. Similarly, servers 1740 and 1745 generally represent computing devices or systems, such as application servers or database servers, configured to provide various database services and/or run certain software applications. Network 1750 generally represents any telecommunication or computer network including, for example, an intranet, a WAN, a LAN, a PAN, or the Internet. In one example, client systems 1710, 1720, and/or 1730 and/or servers 1740 and/or 1745 may include all or a portion of system 100 from FIG. 1.

As illustrated in FIG. 17, one or more storage devices 1760(1)-(N) may be directly attached to server 1740. Similarly, one or more storage devices 1770(1)-(N) may be directly attached to server 1745. Storage devices 1760(1)-(N) and storage devices 1770(1)-(N) generally represent any type or form of storage device or medium capable of storing data and/or other computer-readable instructions. In certain embodiments, storage devices 1760(1)-(N) and storage devices 1770(1)-(N) may represent Network-Attached Storage (NAS) devices configured to communicate with servers 1740 and 1745 using various protocols, such as Network File System (NFS), Server Message Block (SMB), or Common Internet File System (CIFS).

Servers 1740 and 1745 may also be connected to a Storage Area Network (SAN) fabric 1780. SAN fabric 1780 generally represents any type or form of computer network or architecture capable of facilitating communication between a plurality of storage devices. SAN fabric 1780 may facilitate communication between servers 1740 and 1745 and a plurality of storage devices 1790(1)-(N) and/or an intelligent storage array 1795. SAN fabric 1780 may also facilitate, via network 1750 and servers 1740 and 1745, communication between client systems 1710, 1720, and 1730 and storage devices 1790(1)-(N) and/or intelligent storage array 1795 in such a manner that devices 1790(1)-(N) and array 1795 appear as locally attached devices to client systems 1710, 1720, and 1730. As with storage devices 1760(1)-(N) and storage devices 1770(1)-(N), storage devices 1790(1)-(N) and intelligent storage array 1795 generally represent any type or form of storage device or medium capable of storing data and/or other computer-readable instructions.

In certain embodiments, and with reference to example computing system 1610 of FIG. 16, a communication interface, such as communication interface 1622 in FIG. 16, may be used to provide connectivity between each client system 1710, 1720, and 1730 and network 1750. Client systems 1710, 1720, and 1730 may be able to access information on server 1740 or 1745 using, for example, a web browser or other client software. Such software may allow client systems 1710, 1720, and 1730 to access data hosted by server 1740, server 1745, storage devices 1760(1)-(N), storage devices 1770(1)-(N), storage devices 1790(1)-(N), or intelligent storage array 1795. Although FIG. 17 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1740, server 1745, storage devices 1760(1)-(N), storage devices 1770(1)-(N), storage devices 1790(1)-(N), intelligent storage array 1795, or any combination thereof. All or a portion of one or more of the example embodiments disclosed herein may also be encoded as a computer program, stored in server 1740, run by server 1745, and distributed to client systems 1710, 1720, and 1730 over network 1750.

As detailed above, computing system 1610 and/or one or more components of network architecture 1700 may perform and/or be a means for performing, either alone or in combination with other elements, one or more steps of an example method for preparing a secure search index for securely detecting personally identifiable information.

In a non-limiting example, all or a portion of example system 100, example system 200, example computing system 1610, network architecture 1700, or a combination thereof may be owned, used, and/or at least partially controlled by at least one user. In a non-limiting example, all or a portion of example system 100, example system 200, example computing system 1610, network architecture 1700, or a combination thereof may be owned, used, and/or at least partially controlled by at least one untrusted entity. In an example, a user may be a customer of a data loss prevention (DLP) service provider, a user of DLP software, or a combination thereof. In an example, at least a portion of the techniques described herein may be implemented as at least a portion of DLP techniques, fraud prevention techniques, regulatory compliance techniques, data discovery techniques, or a combination thereof.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, data loss prevention systems, data discovery systems, compliance systems, and combinations thereof.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to a display device, use the result of the transformation to search for PII, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. The singular may portend the plural where practicable. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preparing a secure search index for securely detecting personally identifiable information, at least a portion of the method being performed by a computing device comprising at least one processor, the method comprising:
   receiving, at the computing device, a dataset comprising a first record, wherein the first record has a first field comprising a first value describing personally identifiable information; and
   performing, at the computing device, a security action comprising:
      generating, using a perfect hash function, a respective hashed key from the first value, wherein generating the respective hashed key comprises:
         generating, using a base hash function, a first hashed key from the first value;
         detecting a collision between the first hashed key and a second hashed key already in a set of valid hash values;
         responsive to the collision:
            generating the respective hashed key from the first hashed key, a first shift value, a first split value, and a value of a first bit in a binary representation of the first hashed key by:
               aggregating the first shift value with the first hashed key to obtain an aggregated value;
               multiplying the first split value with the value of the first bit in the binary representation of the first hashed key to obtain an adjusted value; and
               aggregating the aggregated value with the adjusted value to obtain the respective hashed key; and
      adding, to the secure search index:
         the respective hashed key; or
         a subsequent hashed key created from the respective hashed key.

2. The method of claim 1, wherein the first value comprises a social security number.

3. The method of claim 1, wherein generating the respective hashed key further comprises:
   blocking, responsive to the collision, the first hashed key and the second hashed key from use in the set of valid hash values;
   generating a third hashed key from the second hashed key, a second shift value, a second split value, and a value of a first bit in a binary representation of the second hashed key; and
   when the third hashed key and the respective hashed key are different:
      adding the third hashed key and the respective hashed key to the set of valid hash values.

4. The method of claim 3, further comprising generating, using the base hash function, the second hashed key from a second value from a first field of a second record.

5. The method of claim 1, wherein the first shift value and the first split value are random numbers.

6. The method of claim 1, further comprising
   randomly selecting a base value; and
   generating the first shift value, the first split value, a subsequent shift value, and a subsequent split value by repeatedly applying a cryptographic hash function to the base value.

7. The method of claim 3, wherein the second hashed key is generated from a second value, and the method further comprising:
   detecting a collision between the third hashed key and the respective hashed key;
   blocking, responsive to the collision, the third hashed key and the respective hashed key from use in the set of valid hash values;
   generating a fifth hashed key from the base hash function, a third shift value, a third split value, and a value of a second bit in a binary representation of the base hash function applied to the first value;
   generating a sixth hashed key from the base hash function, a fourth shift value, a fourth split value, and a value of a second bit in a binary representation of the base hash function applied to the second value; and
   when the fifth hashed key and the sixth hashed key are different:
      adding the fifth hashed key and the sixth hashed key to the set of valid hash values; and
      using the fifth hashed key as the respective hashed key.

8. The method of claim 3, further comprising storing the blocked first hashed key and the blocked second hashed key.

9. The method of claim 1, further comprising:
   generating a concatenated value by concatenating the respective hashed key with a second value from a second field of the first record;

applying a cryptographic hash function to the concatenated value to create the subsequent hashed key; and
adding the subsequent hashed key to the secure search index.

10. The method of claim 9, wherein the cryptographic hash function is a Hash Message Authentication Code algorithm.

11. The method of claim 9, further comprising:
receiving a request to search a document;
extracting a first token and a second token from the document;
generating a candidate hashed key from the first token and the second token;
querying the secure search index to determine whether the candidate hashed key matches any hashed key in the secure search index; and
responding, upon determining the candidate hashed key matches a hashed key in the secure search index, to the request with information about the document.

12. The method of claim 11, wherein:
values in the first field follow a known pattern;
the request to search the document specifies the first token is required to be within a specified distance from the second token; and
extracting the first token and the second token from the document comprises:
using the known pattern to identify the first token within the document; and
identifying the second token within the specified distance from the first token.

13. The method of claim 11, wherein:
values in the first field follow a known pattern; and
extracting the first token from the document comprises using a regular expression based on the known pattern to identify the first token within the document.

14. The method of claim 11, wherein:
the computing device is a server-side computing device; and
extracting the first token and the second token, generating the candidate hashed key, and querying the secure search index are performed at a client-side computing device to which the secure search index has been distributed.

15. The method of claim 11, wherein generating the candidate hashed key further comprises:
generating, using the perfect hash function, an intermediate hashed key from the first token;
generating an intermediate concatenated value by concatenating the intermediate hashed key with the second token; and
applying a cryptographic hash function to the intermediate concatenated value to create the candidate hashed key.

16. A system for preparing a secure search index for securely detecting personally identifiable information, the system comprising:
at least one physical processor; and
physical memory comprising computer-executable instructions that, when executed by the physical processor, cause the physical processor to:
receive a dataset comprising a record, wherein the record has a field comprising a value describing personally identifiable information; and
perform a security action comprising:
generating, using a perfect hash function, a respective hashed key from the value, wherein generating the respective hashed key comprises:
generating, using a base hash function, a first hashed key from the value;
detecting a collision between the first hashed key and a second hashed key already in a set of valid hash values;
responsive to the collision:
generating the respective hashed key from the first hashed key, a first shift value, a first split value, and a value of a first bit in a binary representation of the first hashed key by:
aggregating the first shift value with the first hashed key to obtain an aggregated value;
multiplying the first split value with the value of the first bit in the binary representation of the first hashed key to obtain an adjusted value; and
aggregating the aggregated value with the adjusted value to obtain the respective hashed key; and
adding, to the secure search index:
the respective hashed key; or
a subsequent hashed key created from the respective hashed key.

17. A non-transitory computer-readable medium comprising one or more computer-executable instructions that, when executed by at least one processor of a computing device, cause the computing device to:
receive, by the computing device, a dataset comprising a record, wherein the record has a field comprising a value describing personally identifiable information; and
perform, by the computing device, a security action comprising:
generating, using a perfect hash function, a respective hashed key from the value, wherein generating the respective hashed key comprises:
generating, using a base hash function, a first hashed key from the value;
detecting a collision between the first hashed key and a second hashed key already in a set of valid hash values;
responsive to the collision:
generating the respective hashed key from the first hashed key, a first shift value, a first split value, and a value of a first bit in a binary representation of the first hashed key by:
aggregating the first shift value with the first hashed key to obtain an aggregated value;
multiplying the first split value with the value of the first bit in the binary representation of the first hashed key to obtain an adjusted value; and
aggregating the aggregated value with the adjusted value to obtain the respective hashed key; and
adding, to a secure search index:
the respective hashed key; or
a subsequent hashed key created from the respective hashed key.

* * * * *